United States Patent [19]
Amsen et al.

[11] 3,937,876
[45] Feb. 10, 1976

[54] PICTURE DISPLAY APPARATUS INCLUDING A LINE PHASE DISCRIMINATOR FOR GENERATING A CONTROL VOLTAGE

[75] Inventors: Willem Hendrik Amsen; Paulus Joseph Maria Hovens, both of Eindhoven, Netherlands

[73] Assignee: U.S. Philips Corporation, New York, N.Y.

[22] Filed: Nov. 11, 1971

[21] Appl. No.: 197,886

[30] Foreign Application Priority Data
Nov. 24, 1970 Netherlands.................... 7017137

[52] U.S. Cl...................... 178/7.3 R; 178/69.5 TV
[51] Int. Cl.²........................................... H04N 5/04
[58] Field of Search.......... 178/7.3 R, 7.5 R, 69.5 N

[56] References Cited
UNITED STATES PATENTS
2,750,498 6/1956 Arbuckle.................... 178/69.5 TV
3,593,179 7/1971 Hovens et al................ 178/69.5 TV

*Primary Examiner*—George H. Libman
*Attorney, Agent, or Firm*—Frank R. Trifari; Henry I. Steckler

[57] ABSTRACT

A circuit arrangement in a picture display apparatus including an integrator having a time constant which is of the same order as one field period and which integrates the control voltage generated by the line phase discriminator. The voltage thus integrated is applied by means of a switch to the output terminal of the discriminator during each field blanking period. As a result both the flickering effect and the shift which may occur at the upper edge of the screen of the picture display tube as a result of the broad field synchronizing pulses and the equalizing pulses disappear. The circuit arrangement also includes a circuit which separates the discriminator from the integrator and which may be constituted as a long-tailed pair arrangement.

3 Claims, 1 Drawing Figure

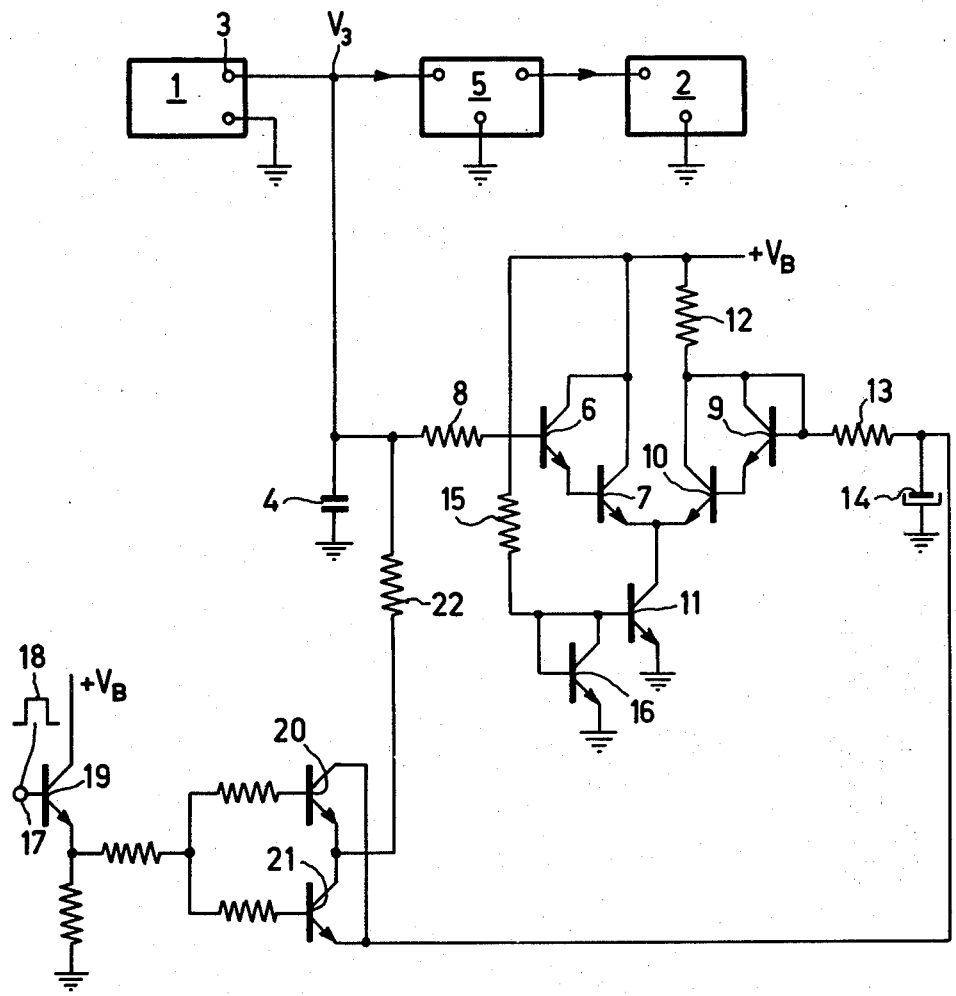

PICTURE DISPLAY APPARATUS INCLUDING A LINE PHASE DISCRIMINATOR FOR GENERATING A CONTROL VOLTAGE

The invention relates to a picture display apparatus including a line phase discriminator for generating a control voltage between output terminals and a field time base, and in which line synchronizing, field synchronizing and equalizing pulses as well as field blanking pulses are processed.

As is known a flickering phenomenon may occur at the upper edge of the screen of the picture display tube in a picture display apparatus, which phenomenon is caused by an odd number of broad field synchronizing pulses and an odd number of equalizing pulses which occur in given television standards such as, for example, the C.C.I.R.-625-line standard which is used in most European countries, when the line oscillator of the apparatus is indirectly synchronized by means, for example, of a phase discriminator. In fact, the phase discriminator generates unequal control voltages at the end of the second equalizing period of two successive fields. In television standards such as, for example, that used in the United States of America in which both the number of broad field synchronizing pulses and that of the equalizing pulses is even, the said flickering phenomenon does not occur because the said two control voltages are then equal.

In both cases, however, the control voltage which is generated after the equalizing pulses succeeding the broad field synchronizing pulses does not have the same amplitude as the control voltage which is generated for the equalizing pulses which precede the same broad pulses, the line frequency being the same. This becomes manifest on the image displayed as a shift of the first written lines of the field which is visible in a troublesome manner at the upper edge of the screen of the picture display tube especially when the picture exhibits a pattern of vertical lines.

German patent specification No. 948.525 describes a circuit arrangement by means of which a compensation voltage is added during the field flyback period to the control voltage generated by the line phase discriminator so that the said shift is reduced. However, this compensation voltage has a field frequency and thus each field is the same so that the flickering phenomenon cannot disappear completely. An object of the present invention is to provide means to substantially eliminate both disturbing phenomena and to this end the display apparatus according to the invention is characterized in that the picture display apparatus is also provided with a circuit arrangement which includes an integrator for integrating the control voltage, and a periodically closing switch arranged between the output terminals of the integrator and those of the discriminator.

The invention is based on the recognition of the fact that the difference between the mean value taken over several field periods of the control voltage generated by the line phase discriminator and this control voltage itself is very low at a given instant, more particularly at the commencement of a field scan period.

In order that the invention may be readily carried into effect, an embodiment thereof will now be described in detail by way of example with reference to the accompanying diagrammatic drawing.

The FIGURE shows a line phase discriminator 1 of known type for a television receiver in which the frequency and the phase of the received line synchronizing pulses are compared with those of the pulses generated by the line oscillator 2 of the receiver. Discriminator 1 applies a voltage between an output terminal 3 and earth to a smoothing capacitor 4 of relatively low capacitance, which voltage is applied to a reactance circuit 5 so that oscillator 2 is recontrolled.

The circuit arrangement in the FIGURE also includes two so-called Darlington combinations which consist of substantially identical transistors and the first of which, constituted by two transistors 6 and 7, is controlled by the control voltage $V_3$ present at terminal 3 through a separating resistor 8, while the collectors of these transistors are connected together and to a terminal of a voltage supply source $V_B$ of, for example, approximately 12 Volt the other terminal of which is connected to earth. The emitter of transistor 7 is connected to the emitter of the second transistor 10 of the second Darlington combination 9, 10 and to the collector of a further transistor 11 which constitutes a constant current source. Transistors 7, 10 and 11 thus constitute a so-called long-tailed pair arrangement. Furthermore the collectors of transistors 9 and 10 are connected together and to the base of transistor 9, while a resistor 12 of high value, for example, approximately 12 K $\Omega$, is arranged between these collectors and the supply terminal. The series network of a resistor 13 of low value and a capacitor 14 of high capacitance is arranged between the same collectors and earth.

The first Darlington combination 6, 7 behaves with respect to alternating current as an emitter follower, that is to say, the base voltage of transistor 6 is present at the collector of transistor 11 while the input impedance of this combination is very high so that the discriminator is substantially not loaded. Current source 11 additionally ensures that the said impedance remains constant independent of control voltage $V_3$. Transistors 9 and 10 may be considered as diodes and have the task of compensating for possible variations of the junction voltages of transistors 6 and 7, for example, as a result of variations of the temperature or the supply voltage $V_B$. The two Darlington combinations and current source 11 thus serve as a separation between resistor 8 and the RC network 13, 14 in which transistors 6 and 9 may only be considered as refinements.

For a satisfactory operation of the circuit arrangement the alternating voltage at the collectors of transistors 9 and 10 must be substantially equal to control voltage $V_3$. A condition therefor is that the junction voltages of transistors 6, 7, 9 and 10 are mutually equal and therefore the emitter currents, and substantially the collector currents, of transistors 7 and 10 must each be equal to half the collector current of transistor 11. The base of this transistor is connected through a resistor 15 to the supply voltage $V_B$ and to earth through a transistor 16 arranged as a diode. Since the collector current of transistor 11 is equal to the current flowing through resistor 15 the above-mentioned condition is:

$$\frac{V_B - V_3}{R_{12}} = \frac{1}{2} \frac{V_B - V_{be}}{R_{15}}$$

in which $R_{12}$ and $R_{15}$ are the values of resistors 12 and 15, respectively, and $v_{be}$ is the junction voltage of transistor 16. It follows therefrom that $$\frac{R_{15}}{R_{12}} = \frac{1}{2} \frac{V_B - V_{bc}}{V_B - V_3}$$
$$\approx \frac{1}{2},$$

if voltages $V_3$ and $v_{be}$ are low relative to supply voltage $V_B$. In the embodiment described the value of resistor 15 is approximately 6.8 K Ω. In this case both currents and hence the junction voltages of transistors 7 and 10 are substantially independent of the variation of the temperature and of the variation of supply voltage $V_B$. In order that these junction voltages are equal the largest variation of control voltage $V_3$ must also be small relative to supply voltage $V_B$, for otherwise the ratio $R_{15}/R_{12}$ would have to be variable.

Under these circumstances the alternating voltage at the collectors of transistors 9 and 10 is substantially equal to control voltage $V_3$. The voltage drop across resistor 8 (approximately 330 ohms) is in fact negligibly small. If control voltage $V_3$ varies, the balance is disturbed. Capacitor 14 is recharged by supply voltage $V_B$ through resistors 12 and 13 and is discharged by current source 11 through transistors 9 and 10 and resistor 13 dependent on the direction of the variation of control voltages $V_3$ until the balance is restored. Thus a voltage is produced across capacitor 14 which is the result of the integration of control voltage $V_3$, i.e. the mean value of this voltage, with a time constant which is equal to the product of the value of resistor 13 and the capacitance of capacitor 14. This time constant has been chosen to be such that the voltage across capacitor 14 during a field period does not noticeably vary, that is to say, the time constant is of the same order as a field period. In the embodiment described the resistance of resistor 13 is approximately 680 Ω while the capacitance of capacitor 14 is approximately 25μF so that the time constant is approximately 17 ms. As is known a complete field takes 20 ms or 16.7 ms dependent on the television standard.

Pulses 18 of field frequency which originate from the field time base (not shown) of the television receiver are applied to a terminal 17. Pulses 18 drive the bases of two transistors 20 and 21 via an emitter follower 19. The emitter of transistor 20 is connected to the collector of transistor 21 and the emitter of transistor 21 is connected to the collector of transistor 20. A separation resistor 22 of low value (approximately 100 Ω) is arranged between the first-mentioned junction and terminal 3 while the second junction is connected to the junction of resistor 13 and capacitor 14.

In the absence of pulse 18 the bases of transistors 20 and 21 are connected to earth via the emitter resistor of transistor 19 and consequently these transistors are cut off. During the occurrence of pulse 18, however, one of these transistors starts to conduct dependent on the polarity of the voltage difference between terminal 3 and the unearthed cladding of capacitor 14. Transistors 20 and 21 consequently constitute a field-frequency switch through which a current flows which flows either through transistor 20 or through transistor 21.

Without the elements denoted by the reference numeral 6 and onwards an interference voltage would be produced at terminal 3 during the field blanking period namely during the first series of equalizing pulses, the broad field synchronizing pulses and the second series of equalizing pulses. As a result one or both of the above-mentioned effects, i.e. the shift and the flickering phenomenon might occur. When pulse 18 coincides with the said period, that is to say, with its leading edge before the first of the equalizing pulses preceding the broad field synchronizing pulses and with its trailing edge after the last of the equalizing pulses succeeding the same broad pulses, the voltage present across capacitor 14 is applied during the same period to terminal 3 so that the above-mentioned interference voltage disappears. Since the voltage thus applied is also the mean value of control voltage $V_3$, the difference between the two voltages is very small. At the instant when switch 20, 21 again opens there is thus substantially no difference between the voltage which was just present at terminal 3 and the voltage which is now set up at discriminator 1 due to the operation of this discriminator. For this purpose the applied voltage must originate from a low resistive source and therefore the capacitance of capacitor 14 must be high relative to that of capacitor 4. In the embodiment mentioned hereinbefore these capacitances are 25μF and 56nF, respectively. It follows that the value of resistor 13 must be low so that the separation circuit 6 to 12 and 15, 16 is required lest phase discriminator 1 is loaded too much.

It may be noted that pulse 18 need not necessarily be defined so exactly as described above. The operation of the circuit arrangement is substantially the same when pulse 18 occurs somewhere during the field blanking period provided that its duration comprises the defined period of time. It may also be noted that the known circuit arrangement can only provide a satisfactory compensation for the nominal line frequency. In the circuit arrangement according to the invention, however, the result is always satisfactory. In fact, when the frequency of the received pulses and/or of the line synchronizing pulses generated by line oscillator 2 deviates from the nominal value, control voltage $V_3$ also deviates from its nominal value, but the voltage across capacitor 14 has the same deviation.

Furthermore it may be noted that all elements of the circuit arrangement, except capacitors 4 and 14, may be integrated in a simple manner in a semiconductor body. It is thereby even better ensured that the junction voltages of transistors 6, 7, 9 and 10 are substantially identical under all circumstances.

What is claimed is:

1. A circuit comprising a line phase discriminator having an output means for supplying a control voltage, integrator means having an input coupled to said discriminator output and an output means for supplying an integrated control voltage, a field frequency periodically operating switching means coupled between said outputs and a separating circuit means coupled between said outputs for isolating said discriminator from said integrator.

2. A circuit as claimed in claim 1 wherein said separating circuit comprises first, second and third transistors each of said transistors having emitter, base, and collector electrodes, said first and second transistor emitters being coupled together and to said third transistor collector, a first resistor coupled between said third transistor base and to a first terminal of a voltage supply, said third transistor emitter being coupled to a second terminal of said voltage supply, a diode means coupled between said third transistor base and said second terminal, a second resistor coupled to the collector of one of said first and second transistors and said first terminal, said one transistor collector being coupled to said integrator.

3. A circuit as claimed in claim 2 wherein the value of said first resistor is approximately half the value of said second resistor and said supply voltage is high relative to said control voltage.

* * * * *